United States Patent
Fries et al.

(10) Patent No.: US 11,425,916 B2
(45) Date of Patent: Aug. 30, 2022

(54) PROCESS FOR PRODUCING A CREAMER

(71) Applicant: NESTEC S.A., Vevey (CH)

(72) Inventors: Lennart Fries, Lausanne (CH); Christoph Reh, Epalinges (CH); Lucile Waksman, Bern (CH); Christopher James Pipe, Lausanne (CH); Martin Leser, Bretigny-sur-Morrens (CH); Chrystel Loret, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 152 days.

(21) Appl. No.: 16/074,982

(22) PCT Filed: Feb. 3, 2017

(86) PCT No.: PCT/EP2017/052443
§ 371 (c)(1),
(2) Date: Aug. 2, 2018

(87) PCT Pub. No.: WO2017/134257
PCT Pub. Date: Aug. 10, 2017

(65) Prior Publication Data
US 2019/0037870 A1 Feb. 7, 2019

(30) Foreign Application Priority Data

Feb. 4, 2016 (EP) .................................. 16154279
Dec. 6, 2016 (EP) .................................. 16202502

(51) Int. Cl.
| | | |
|---|---|---|
| A23C 11/04 | (2006.01) | |
| A23C 11/08 | (2006.01) | |
| A23C 13/12 | (2006.01) | |
| A23C 13/00 | (2006.01) | |

(52) U.S. Cl.
CPC .............. *A23C 11/04* (2013.01); *A23C 11/08* (2013.01); *A23C 13/00* (2013.01); *A23C 13/12* (2013.01)

(58) Field of Classification Search
CPC ......... A23C 11/04; A23C 11/08; A23C 13/00; A23C 13/12
USPC ......................... 426/580, 585, 586, 587, 588
See application file for complete search history.

(56) References Cited

U.S. PATENT DOCUMENTS

| | | | |
|---|---|---|---|
| 2006/0073256 A1* | 4/2006 | Destaillats | A23C 11/08 |
| | | | 426/570 |
| 2011/0293800 A1* | 12/2011 | Sher | A23C 11/00 |
| | | | 426/250 |
| 2018/0177215 A1* | 6/2018 | Fu | A23C 11/08 |

FOREIGN PATENT DOCUMENTS

| | | |
|---|---|---|
| CN | 101919455 A | 12/2010 |
| CN | 102696788 | 10/2012 |
| CN | 102696788 A | 10/2012 |
| CN | 102696789 A | 10/2012 |
| GB | 2381731 | 5/2003 |
| RU | 2549693 C2 | 4/2015 |
| WO | 2012143515 | 10/2012 |
| WO | 2015000885 | 1/2015 |
| WO | 2015155024 | 10/2015 |

OTHER PUBLICATIONS

CN102898516A, translation, Oct. 2012.*
Kolodyaznaya., "Food Chemistry", 1999, pp. 15-16.
"Association of Independent Experts in the Field of Mineral Resources, Metallurgy and Chemical Industry", InfoMain, Research Group, Review of Dioxide Titanium Market in CIS and Forecast of its Development in Conditions of Financial Crisis, 2009, p. 10.
Russia Patent Office Action for Application No. 2018131438, dated Jan. 26, 2021, 8 Pages.
Kolodyaznaya, "Food Chemistry", 1999, pp. 10-11.
Russia Patent Office Communication for Application No. 2018131438, dated Sep. 8, 2020, 12 Pages.
China Patent Office Communication for Application No. 201780006231.5, dated Mar. 9, 2022, 16 pages.

* cited by examiner

Primary Examiner — Leslie A Wong
(74) Attorney, Agent, or Firm — K&L Gates LLP

(57) ABSTRACT

The present invention relates to a process for producing a creamer comprising; (a) i) incorporating a mineral into an oil component by high shear mixing to provide a first composition; and ii) mixing the first composition with an aqueous component to provide a second composition; or (b) i) incorporating a mineral into an aqueous component to provide a first composition; and ii) mixing the first composition with an oil component to provide a second composition; iii) homogenizing the second composition from step ii) of (a) or (b) to provide an oil-in-water emulsion.

14 Claims, 4 Drawing Sheets

PROCESS FOR PRODUCING A CREAMER

CROSS REFERENCE TO RELATED APPLICATIONS

The present application is a National Stage of International Application No. PCT/EP2017/052443, filed on Feb. 3, 2017, which claims priority to European Patent Application No. 16154279.0, filed on Feb. 4, 2016, and European Patent Application No. 16202502.7, filed on Dec. 6, 2016, the entire contents of which are being incorporated herein by reference.

FIELD OF THE INVENTION

The present invention relates to a process for producing a creamer. The invention further relates to the use of said creamers in beverages or beverage capsules.

BACKGROUND TO THE INVENTION

Creamers are widely used in hot and cold beverages, e.g. coffee, cocoa, tea, etc. They are commonly used in place of milk and/or dairy cream. Creamers may come in a variety of different flavours and provide mouthfeel, body and a smooth texture to the beverage.

Consumers and health authorities are seeking nutritionally balanced beverages with reduced calorie content. Many beverages are therefore transitioning to low fat and low sugar versions in order to limit the calories in the beverage.

However, fat and sugar reduction often results in reduced creaminess, texture and richness (commonly referred to as 'mouthfeel') of the product as described by consumers. In particular, by reducing the fat and sugar in the recipe, the resulting beverage is commonly perceived as watery, thin, weak, diluted and low quality. This is a particular problem for creamers, which normally rely on a significant fat content to achieve the preferred mouthfeel for consumers.

Additives may be used to modulate the mouthfeel of products, especially in low fat variants. These include flavour preparations sold as "mouthfeel enhancers", however the sensory impact of such ingredients is limited. Another approach is to use hydrocolloids, for example, starches, xanthan, celluloses, carrageenan or other hydrocolloids, to increase the viscosity of the beverage. However, the introduced increase of continuous water phase texture does not mimic the creaminess perception created by the dispersed lipid phase: the more viscous texture produced is often perceived as artificial or chemical by the consumer. Many additives suffer additionally from poor water solubility. Therefore, the amount of additive that can be introduced into a low fat beverage composition is limited so as not to hamper the reconstitution or the homogeneity of the product.

Minerals such as titanium dioxide, silicon dioxide and calcium carbonate have been added to powdered creamer products by dry mixing. However, the resulting creamer particles settle in the cup and form sediments after reconstitution in the beverage. This noticeable layer of particles is undesirable and is perceived negatively by consumers.

There is a need for alternative beverage compositions that have the creamy and thick texture desired by consumers, in particular there is a need for low calorie creamers providing desired mouthfeel.

SUMMARY OF THE INVENTION

The present inventors have determined that a creamer with desired mouthfeel properties can be provided by incorporating solid micro-particles of mineral with poor water and oil solubility into a liquid component during a creamer preparation process. Accordingly, in a first aspect the present invention provides a process for producing a creamer comprising;
   (a) i) incorporating a mineral into an oil component by high shear mixing to provide a first composition; and
      ii) mixing the first composition with an aqueous component to provide a second composition; or
   (b) i) incorporating a mineral into an aqueous component to provide a first composition; and
      ii) mixing the first composition with an oil component to provide a second composition; and
      iii) homogenising the second composition from step ii) of (a) or (b) to provide an oil-in-water emulsion.

Step i) of (b) may be performed by high shear mixing or milling.

The high shear mixing may be performed at a shear rate of about 5,000 to 500,000 $s^{-1}$ for about 1 to 30 seconds in a continuous in-line mixer, or 1-90 minutes in a batch tank mixer.

The mean particle size of the mineral may be 0.1 to 100 µm, preferably 3 to 10 µm.

The term "mineral" as used herein refers to inorganic hard crystalline materials insoluble in water and oil (for example silicon dioxide or titanium dioxide). The term also refers to inorganic salts with poor water solubility (for example calcium carbonate). Preferably, the term "poor solubility" refers to an inorganic salt with a solubility of about 10% or less of the added mineral at product pH and temperature. Therefore the mineral is present in the final beverage in the form of dispersed micro particles. The mineral may preferably be selected from the group consisting of calcium carbonate, magnesium carbonate, calcium phosphate, silicon dioxide, dicalcium phosphate, magnesium phosphate, calcium stearate, magnesium stearate, magnesium silicate and titanium dioxide and mixes thereof.

In a preferred embodiment the mineral is calcium carbonate.

The aqueous component may comprise a milk protein and/or a plant protein. For example, the aqueous component may comprise skim milk solids, casein, caseinate (preferably sodium caseinate) and/or whey protein.

The process may further comprise the step of drying the oil-in-water emulsion to provide a dried creamer.

The process may further comprise the steps of:
   adding a bulking and/or sweetener agent(s) to the oil-in-water emulsion; and/or
   pasteurizing or commercially sterilizing the oil-in-water emulsion.

One or more emulsifiers may be added in step (a) or (b) or during the homogenization step iii), preferably wherein the one or more emulsifiers are added to the oil component.

The second composition provided in step ii) of (a) or (b) may comprise at least 5% (w/w) of the oil component, such as in the range 5-40, 5-30, 10-30, 10-25 or 20-25%.

The second composition provided in step ii) of (a) or (b) may comprise added mineral particles in a concentration of at least 1.0% (w/w) dispersed mineral particles, such as in the range 1.0-50%, 2.0-30%, 2.0-15% or 2.5-10%.

In one embodiment coffee solids may be added during step (a) or (b)

In another aspect the present invention provides a creamer obtainable by a process according to the first aspect of the invention.

In a further aspect the present invention provides a ready-to-drink beverage comprising a creamer according to the present invention.

In another aspect the present invention provides the use of a mineral for enhancing mouthfeel of a creamer, wherein the mineral is incorporated into an oil component by high shear mixing or is incorporated into an aqueous component by high shear mixing or milling.

In another aspect the present invention provides the use of the present creamer for preparation of capsules to be used in a beverage dispenser.

DETAILED DESCRIPTION OF THE INVENTION

Creamer

Figure 1:
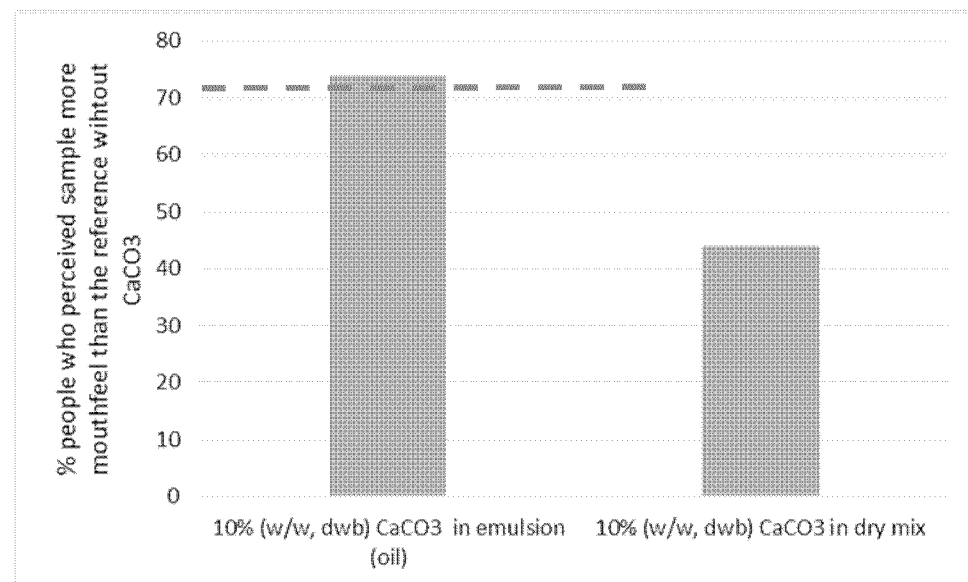
FIG. 1—Sensory pair comparison on the mouthfeel perception of coffee mixes with addition of 10% (w/w, dry weight basis (dwb) $CaCO_3$ dispersed in the creamer emulsion or the dispersion in the dry creamer compared to a low fat creamer without addition of $CaCO_3$. The dashed line represents the bound of statistical significance, above which, the results are significant.

The present disclosure relates to a process for producing a creamer and a creamer obtainable from said process. The creamer may be added to any suitable beverage in an amount sufficient to provide a mouthfeel desired by consumers.

The creamer may be in a liquid form or a powdered form.

The creamer may be a stable and/or aseptic liquid creamer including water ranging from approximately 30% to 90% by weight.

Incorporating

The present inventors have determined that incorporating a mineral into an oil component or an aqueous component during the production of a creamer (i.e. as a wet dispersion process) provides an improvement in the mouthfeel of the creamer compared to incorporation of a mineral in a dry mixing step.

As used herein, the term "mouthfeel" refers to the perceived creaminess, texture and richness of the creamer or the beverage to which the creamer is added.

As used herein the term "incorporating" is synonymous with "dispersing".

The wet dispersion process of the present invention results in a suspension of mineral particles that is stable throughout the entire creamer production process.

In one embodiment the mineral is incorporated into an oil component by high shear mixing to provide a first composition.

In one embodiment, the step of incorporating the mineral into the oil component does not comprise milling (e.g. bead milling or roller milling) the mineral in the oil component. Thus in one embodiment, the step of incorporating the mineral into the oil component may comprise high shear mixing but not milling (e.g. bead milling or roller milling).

In one embodiment the mineral is incorporated into an aqueous component to provide a first composition. The step of incorporating the mineral into the aqueous component may be performed by, for example, high shear mixing or milling (e.g. bead milling or roller milling).

High-shear mixing is used to disperse one phase or ingredient (herein the mineral) into a main continuous phase (herein the oil component or aqueous component). A rotor or impeller, together with a stationary component known as a stator, or an array of rotors and stators, may be used either in a tank containing the solution to be mixed, or in a pipe through which the solution passes, to create shear. A high-shear mixer can be used to create emulsions, suspensions, lyosols (gas dispersed in liquid), and granular products. Accordingly, the present high shear mixing may be performed using any suitable device. For example, the high shear mixing may be performed using a rotor-stator high shear mixer.

The high shear mixing may be performed using a continuous in-line mixer (e.g. in a pipe) at a shear rate of approximately 5,000 to 500,000 $s^{-1}$, 5,000 to 400,000 $s^{-1}$ or 5,000 to 200,000 $s^{-1}$ for approximately 1 to 30 seconds. The high shear mixing may be performed using a shear rate of approximately 5,000 to 500,000 $s^{-1}$, 5,000 to 400,000 $s^{-1}$ or 5,000 to 200,000 $s^{-1}$ for approximately 1 to 15 seconds. The high shear mixing may be performed using a shear rate of approximately 5,000 to 500,000 $s^{-1}$, 5,000 to 400,000 $s^{-1}$ or 5,000 to 200,000 $s^{-1}$ for approximately 1 to 10 seconds. The high shear mixing may be performed using a shear rate of approximately 5,000 to 500,000 $s^{-1}$, 5,000 to 400,000 $s^{-1}$ or 5,000 to 200,000 $s^{-1}$ for approximately 5 seconds. In one embodiment the high shear mixing may be performed using a shear rate of approximately 50,000 $s^{-1}$ for approximately 5 seconds.

The high shear mixing may be performed using a batch or semi-continuous mixer (e.g. in a tank) at a shear rate of approximately 5,000 to 500,000 $s^{-1}$, 5,000 to 400,000 $s^{-1}$ or 5,000 to 200,000 $s^{-1}$ for approximately 0.5 to 90 minutes. The high shear mixing may be performed using a shear rate of approximately 5,000 to 500,000 $s^{-1}$, 5,000 to 400,000 $s^{-1}$ or 5,000 to 200,000 $s^{-1}$ for approximately 1 to 60 minutes. The high shear mixing may be performed using a shear rate of approximately 5,000 to 500,000 $s^{-1}$, 5,000 to 400,000 $s^{-1}$ or 5,000 to 200,000 $s^{-1}$ for approximately 10 to 60 minutes. The high shear mixing may be performed using a shear rate of approximately 5,000 to 500,000 $s^{-1}$, 5,000 to 400,000 $s^{-1}$ or 5,000 to 200,000 $s^{-1}$ for approximately 30 minutes. In one embodiment the high shear mixing may be performed using a shear rate of approximately 50,000 $s^{-1}$ for approximately 30 minutes.

Milling may be used to divide a solid material into finer particles and distribute said particles evenly within a liquid carrier. Milling may also be used solely to distribute solid particles evenly within a liquid carrier. The present milling may be performed using any suitable milling device. For example, the milling may be performed using a bead mill.

The milling may be performed using an average shear rate of approximately 5,000 to 30,000 $s^{-1}$, 5,000 to 20,000 $s^{-1}$, 5,000 to 15,000 s$^{-1}$ for an active process time of approximately 10 to 180 seconds. The active process time is defined herein as hydraulic residence time of the solid material within the milling chamber (e.g. one passage through the active volume of a bead mill). The milling may be performed using an average shear rate of approximately 5,000 to 30,000 s$^{-1}$, 5,000 to 20,000 s$^{-1}$, 5,000 to 15,000 s$^{-1}$ for approximately 30 to 90 seconds. The milling may be performed using an average shear rate of approximately 5,000 to 30,000 s$^{-1}$, 5,000 to 20,000 s$^{-1}$, 5,000 to 15,000 s$^{-1}$ for approximately 60 seconds. In one embodiment the milling may be performed using an average shear rate of approximately 10,000 s$^{-1}$ for approximately 60 seconds.

The mineral may be incorporated into a part of the oil component and/or the aqueous component and additional oil component or aqueous component may then be added. Thus in one embodiment, one or more additional oil components or aqueous components may be added after step iii), such as before pasteurization and/or drying.

The order of mixing of the different components may vary. Preferably, the oil component and the aqueous component are prepared separately. Emulsifiers are typically added to the oil component but may be added to the aqueous component. Proteins, for example milk proteins, are typically dissolved in the aqueous component. The two components are then mixed and homogenized to produce an emulsion, which can be used directly in liquid form or subsequently dried for later reconstitution In one embodiment, the present invention provides a process for producing a creamer comprising;

I) mixing an oil component and an aqueous component; and

II) homogenizing the composition from step I) to provide an oil-in-water emulsion;

wherein a mineral is incorporated into the oil component or the aqueous component prior to step I). The process may comprise any of the features as described herein.

Mineral

The mineral used in the present method is a micronized powder. The term "micronized" relates to a process wherein the particles are processed to particle sizes below 100 μm. The solid mineral particles are characterized by poor water and oil solubility. Preferably, during a creamer preparation process about 10% or less of the added mineral particles are soluble.

The mineral may have a mean particle size of approximately 0.1 to 100 μm. In one embodiment the mineral may have a mean particle size of approximately 1 to 20 μm. The mineral may have a mean particle size of approximately 1, 2, 3, 4, 5, 6, 7, 8, 9, 10, 11, 12, 13, 14, 15, 16, 17, 18, 19 or 20 μm. In a preferred embodiment the mean particle size is between 2 and 5 μm. In a further preferred embodiment the mean particle size is between 2 and 5 μm and substantially all particles have a particle diameter below 10 μm.

As used herein, the term "mean particle size" refers to the mean diameter over volume (D[4,3]) of the mineral particles. The mean diameter over volume may be determined by laser diffraction. For example, mean diameter over volume may be determined by laser diffraction using a Mastersizer 2000 Instrument. Detailed parameters are presented in Table 7. To measure the particles size of CaCO3 a refractive index (RI) of 1.66 for this material may be used.

TABLE 7

Set up parameters for the particle size distribution measurements

| Instrument Set up | | Sample set up | |
|---|---|---|---|
| Material RI/Absorption | 1.45/0.01 | Pump | 850 rpm |
| Dispersant RI/Absorption | 1.33/0.01 | Stirrer | 780 rpm |
| Measurement time | 12 s, 12000 snaps | Pre-measurement time | 1 min |
| Background time | 12 s, 12000 snaps | Cycle | 1 aliquot |
| | | Measurement Delay | 30 s |

The mineral may be added such that it is present in the fresh creamer emulsion (composition according to step ii) a or b) at a weight percentage of about 1 to about 50% (w/w), such as in the range 1.0-50%, 2.0-30%, 2.0-15% or 2.5-10%. For example, the mineral may be added such that it is present at a weight percentage of about 1, 2, 3, 4, 5, 6, 7, 8, 9, 10, 20, 30 or 50% (w/w). As the fresh creamer comprises water, this % (w/w) refers to the total weight (i.e. including the water weight).

The mineral may be added such that it is present in a dried creamer at a weight percentage of about 2 to about 20% (w/w, dwb), for example about 2, 3, 4, 5, 6, 7, 8, 9, 10, 11, 12, 13, 14, 15, 16, 17, 18, 19 or 20% (w/w, dwb).

As such, the mineral may be present in a ready-to-drink beverage at a concentration of about 0.1 to about 0.8% (w/w), for example about 0.1, 0.2, 0.3, 0.4, 0.5, 0.6, 0.7 or 0.8% (w/w).

The term mineral as used herein refers to inorganic hard crystalline materials insoluble in water and oil or inorganic salts with poor water solubility. Preferably, about 10% or less of the added mineral is soluble at product pH and temperature. Therefore the mineral is present in the final beverage in the form of dispersed micro particles. The mineral may preferable be selected from the group consisting of calcium carbonate, magnesium carbonate, calcium phosphate, silicon dioxide, dicalcium phosphate, magnesium phosphate, calcium stearate, magnesium stearate, magnesium silicate and titanium dioxide. The density of the mineral may affect the stability of the oil the emulsion. The mineral preferably has a bulk density of less than 0.5 g/cc, more preferably less than 0.4 g/cc, even more preferably less than 0.35 g/cc. The tapped density of the mineral is preferably less than 0.8 g/cc, more preferably less than 0.6 g/cc, and even more preferably less than 0.5 g/cc.

In a preferred embodiment, the mineral is calcium carbonate ($CaCO_3$).

The mineral, for example the $CaCO_3$, may have been obtained by a precipitation process.

As used herein, the mineral is not dissolvable in either the oil component or the aqueous component. As used herein, the minerals are distinguishable from the calcium naturally present in dairy products (e.g. in the form of calcium phosphate-protein complexes). In one embodiment, the present creamers do not comprise calcium phosphate-protein complexes, natural dairy products containing calcium phosphate-protein complexes or natural dairy products (e.g. milk).

In a preferred embodiment the mineral is calcium carbonate ($CaCO_3$) with a mean particle size of 2-5 μm, a bulk density of less than 0.35 g/cc, a tapped density of less than 0.5 g/cc and with substantially all particles having a diameter below 10 μm.

Oil Component

As used herein, the term "component" is synonymous with the term "phase".

The oil component may be selected from different sources. In one embodiment the oil component comprises oil selected from the group consisting of palm kernel oil or olein, hydrogenated palm kernel oil, algal oil, canola oil, soy bean oil, sunflower oil, safflower oil, cotton seed oil, palm oil, milk fat, corn oil, high oleic variants of oils such as high oleic soybean, high oleic canola, high oleic safflower, high oleic sunflower oil, and/or coconut oil.

The oil is preferably present in the final creamer composition in an amount of at most about 50% (weight/weight), the amount of oil in the creamer composition may, for example, be about 1% to 50% (weight/weight), such as in the range 10-40%, 10-40%, 14-35%.

In the present context, unless otherwise specified, weight/weight percentages referred to herein are based on dry solids. When oil is included in the weight/weight percentages the % relates to the non-water part but including oil (solid content+oils).

The total amount of oil component in the aqueous composition may also vary. Thus, in yet a further embodiment the aqueous composition comprises at least 5% (w/w) of the oil component, such as in the range 5-50%, 5-40%, 5-30%, 10-30%, or 20-25%. In another embodiment the aqueous composition comprises at least 20% (w/w) of the oil component.

Aqueous Component

The process of the invention also includes the addition of an aqueous component.

The aqueous component may be any ingredient or combination of ingredients useful for inclusion in a creamer composition. The aqueous component may include one or more dairy ingredients or dairy substitute ingredients. Thus, in one embodiment the aqueous component may comprise a protein, a hydrocolloid, a buffering agent, and/or a sweetener.

The aqueous component preferably comprises protein in the range 0.5-15%, 1.5-10%, 1.5-5% 0.1-3%, 0.2-2% protein, preferably between about 0.5% (weight/weight) and about 1.5% protein.

For example, the dairy ingredients can be milk, milk fat, milk powder, skim milk, milk proteins and combinations thereof. Examples of suitable dairy proteins are casein, caseinate, casein hydrolysate, whey, whey hydrolysate, whey concentrate, whey isolate, milk protein concentrate, milk protein isolate, and combinations thereof. The protein is preferably sodium caseinate. Furthermore, the dairy protein may be, for example, sweet whey, acid whey, α-lactalbumin, β-lactoglobulin, bovine serum albumin, acid casein, caseinates, α-casein, β-casein and/or γ-casein. Suitable dairy substitute ingredients include plant proteins such as soy proteins, rice proteins, almond proteins, peanut proteins and combinations thereof, for example. In an embodiment, milk fat is present in the beverage in an amount from about 0% to about 1.5% of the beverage. The protein in the composition may work as an emulsifier, provide texture, and/or provide whitening effect. Too low levels of protein may reduce the stability of the liquid creamer. At too high protein levels the viscosity of the product may be higher than desired and too high for liquid processing.

The aqueous component may further include a buffering agent. The buffering agent can prevent undesired creaming or precipitation of the creamer upon addition into a hot, acidic environment such as coffee. The buffering agent can be, for example, monophosphates, diphosphates, sodium mono- and bicarbonates, potassium mono- and bicarbonates, or a combination thereof. Preferred buffers are salts such as potassium phosphate, dipotassium phosphate, potassium hydrophosphate, sodium bicarbonate, sodium citrate, sodium phosphate, disodium phosphate, sodium hydrophosphate, and sodium tripolyphosphate. The buffer may e.g. be present in an amount of about 0.1 to about 3% by weight of the creamer.

The aqueous component may further include one or more additional ingredients such as flavourings, sweeteners, colorants, antioxidants, or a combination thereof. Sweeteners can include, for example, sucrose, fructose, dextrose, maltose, dextrin, levulose, tagatose, galactose, corn syrup solids and other natural or artificial sweeteners. Sugarless sweeteners can include, but are not limited to, sugar alcohols such as maltitol, xylitol, sorbitol, erythritol, mannitol, isomalt, lactitol, hydrogenated starch hydrolysates, and the like, alone or in combination. Usage level of the flavourings, sweeteners and colorants will vary greatly and will depend on such factors as potency of the sweetener, desired sweetness of the product, level and type of flavouring used and cost considerations. Combinations of sugar and/or sugarless sweeteners may be used. In one embodiment, a sweetener is present in the creamer composition of the invention at a concentration ranging from about 5-90% by weight of the total composition, such as in the range 20-90%, preferably such as 20-70%. In another embodiment, the sweetener concentration ranges from about 40% to about 60% by weight of the total composition.

The term "hydrocolloids" relates to compounds that help to increase physical viscosity of the composition. Suitable hydrocolloids may e.g. be carrageenan, such as kappa-carragenan, iota-carragenan, and/or lambda-carragenan; starch, e.g. modified starch; cellulose, e.g. microcrystalline cellulose, methyl cellulose, or carboxy-methyl cellulose; agar-agar; gelatine; gellan (e.g., high acyl, low acyl); guar gum; gum Arabic; kojac; locust bean gum; pectin; sodium alginate; maltodextrin; tracaganth; xanthan; or a combination thereof.

In one embodiment, the creamer does not comprise a hydrocolloid.

In a preferred embodiment the aqueous component comprises sodium caseinate. In a preferred embodiment the aqueous component comprises sodium caseinate, dipotassium phosphate, sodium hexametaphosphate, trisodium citrate, sodium chloride and water. In one embodiment the aqueous component does not comprise dairy proteins (i.e. for production of a non-dairy creamer).

Examples of typical aqueous compositions are presented in Tables 1-3 below.

TABLE 1

| Aqueous component for non-dairy creamers | | | |
| --- | --- | --- | --- |
| Ingredients | Non-dairy (NDC) | | |
| (in % by weight) | LOW FAT | REGULAR | HIGH FAT |
| Milk solids non-fat (SNF) | no | no | no |
| Casein/caseinate | 1.5-3.0 | 1.5-3.0 | 1.5-3.0 |
| Lactose/sweet whey | no | 110 | no |
| Glucose syrup | 80-90 | 50-60 | 40-50 |
| Milk fat | no | no | no |
| Vegetable fat | 10-20 | 30-35 | 40-50 |
| Emulsifiers | yes | yes | yes |
| Buffer salts | yes | yes | yes |
| Flavours | optional | optional | optional |
| Colorants | optional | optional | optional |

TABLE 1-continued

Aqueous component for non-dairy creamers

| Ingredients (in % by weight) | Non-dairy (NDC) | | |
|---|---|---|---|
| | LOW FAT | REGULAR | HIGH FAT |
| Flowing agents | optional | optional | optional |
| Moisture | 1-3 | 1-3 | 1-3 |

TABLE 2

Aqueous component for filled dairy creamers

| Ingredients (in % by weight) | Filled dairy (FDC) | | |
|---|---|---|---|
| | LOW FAT | REGULAR | HIGH FAT |
| Milk solids non-fat (SNF) | 70-90 | 20-40 | 20-40 |
| Casein/caseinate | optional | optional | optional |
| Lactose/sweet whey | 0-10 | 20-40 | 20-40 |
| Glucose syrup | optional | optional | optional |
| Milk fat | no | no | no |
| Vegetable fat | 0-10 | 25-30 | 35-40 |
| Emulsifiers | no | no | no |
| Buffer salts | yes | yes | yes |
| Flavours | optional | optional | optional |
| Colorants | optional | optional | optional |
| Flowing agents | optional | optional | optional |
| Moisture | 1-3 | 1-3 | 1-3 |

TABLE 3

Aqueous component for full dairy creamers

| Ingredients (in % by weight) | Full dairy |
|---|---|
| Milk solids non-fat (SNF) | 30-40 |
| Casein/caseinate | optional |
| Lactose/sweet whey | 0-40 |
| Glucose syrup | no |
| Milk fat | 15-30 |
| Vegetable fat | No |
| Emulsifiers | no |
| Buffer salts | yes |
| Flavours | optional |
| Colorants | optional |
| Flowing agents | optional |
| Moisture | 1-3 |

The skilled person may produce other variants of aqueous components which are suitable for the production of creamers. Thus, the above are mere examples of aqueous compositions.

Mixing

The mixing of the oil component and aqueous component described herein may be performed using any suitable method.

For example, the oil component may be poured into the aqueous component to form a pre-emulsion, which is then kept under gentle agitation and then mixed using a high shear mixer.

Homogenizing

The term "homogenizing" or "homogenized" or homogenization" is a unit operation using a class of processing equipment referred to as homogenizers that are geared towards reducing the size of droplets in liquid-liquid dispersions. Examples of homogenizers may include high speed blender, high pressure homogenizers, Colloid Mill, high shear dispersers, ultrasonic disruptor, membrane homogenizers. APV HTST (high temperature short time) as shown in the present examples below is also a homogenizer used to impose a sufficient stress to break-up the oil into fine droplets.

Bulking and/or Sweetener Agent

The present process may comprise the step of adding a bulking and/or sweetener agent(s), for example an agent as described herein, to the oil-in water emulsion.

The bulking agent may comprise maltodextrin.

The sweetener agent may comprise sugar and/or carbohydrate. The sweetener agent may comprise glucose syrup.

Drying

The present process may comprise the step of drying the oil-in-water emulsion of step iii) to produce a dried creamer, for example a powdered creamer.

The drying step may be performed by spray drying, vacuum band drying, roller drying or freeze drying.

The dried creamer as obtained after the drying step can be used for making creamers for use in beverage industry for example as milk additive for coffee and tea beverage. The dried creamer may be used to make beverage powders such a chocolate/malt beverages, coffee mixes and culinary products for retail purposes. Such a dried creamer may also be used for preparation of capsules to be used in a beverage dispenser or in containers for other beverage dispenser.

Pasteurizing or Commercially Sterilizing

The present process may comprise the step of pasteurizing or commercially sterilizing the oil-in-water emulsion.

The pasteurizing step may be performed at a minimum temperature of 81° C. for at least 5 seconds. The composition as obtained after the pasteurizing step can be used for making ready-to-drink beverages.

The process may comprises further steps of HTST (high temperature short time) or UHT (Ultra-high temperature processing) using either direct or indirect process; and Filled on a clean fill, ultra clean fill (ESL) or aseptic filler.

The process may also include a drying step. The drying step may be performed by spray drying, vacuum band drying, roller drying or freeze drying. The powdered creamer obtained after the drying step can be used for making powdered creamers for use in beverage industry for example as milk additive for coffee and tea beverage or for culinary applications such as creamy soups and sauces. Such a powdered creamer may also be used for preparation of capsules to be used in a beverage dispenser.

Emulsifier

The process may comprise adding one or more emulsifiers in step (a) or (b).

The emulsifier may be a low molecular weight emulsifier. By a low molecular weight emulsifier is meant an emulsifier with a molecular weight below 1500 g/mol. Emulsions are thermodynamically unstable, and the phases of an emulsion will separate with time. By an emulsifier is meant a compound that stabilises the interface between the two phases of the oil-in-water emulsion and reduces the rate of phase separation. In an embodiment the emulsifiers are selected from the group consisting monoglycerides, diglycerides, acetylated monoglycerides, sorbitan trioleate, glycerol dioleate, sorbitan tristearate, propyleneglycol monostearate, glycerol monooleate and monostearate, sorbitan monooleate, propylene glycol mono laurate, sorbitan monostearate, sodium stearoyl lactylate, calcium stearoyl lactylate, glycerol sorbitan monopalmitate, diacetylated tartaric acid esters of monoglycerides, lecithins, lysolecithins, succinic acid esters of mono- and/or diglycerides, lactic acid esters of mono- and/or diglycerides, lecithins, lysolecitins, proteins and sucrose esters of fatty acids, lecithin (e.g. soy lecithin, canola lecithin, sunflower lecithin, and/or safflower lecithin), lysolecithins, and combinations thereof.

In one embodiment the aqueous phase comprises sodium caseinate and the one or more emulsifiers refers to an emulsifier other than sodium caseinate.

The emulsifier(s) may be added to either the oil component or the aqueous component. Preferably, the emulsifier(s) may be added to the oil component prior to mixing with the aqueous component.

Emulsifier(s) may be added during mixing of the oil component and aqueous component and/or during homogenization to produce an oil-in-water emulsion.

Those skilled in the art will understand that they can freely combine all features of the present invention described herein, without departing from the scope of the invention as disclosed.

Various preferred features and embodiments of the present invention will now be described by way of non-limiting examples.

EXAMPLES

Example 1—Comparison of Wet and Dry Mixing of $CaCO_3$ Particles into a Creamer Preparation The easiest way to introduce $CaCO_3$ particles into a creamer formulation is by dry mixing with the final spray dried creamer powder. Other options are to mix $CaCO_3$ particles into either the oil phase or the aqueous phase of the creamer preparation, before preparing the emulsion.

Figure 2:
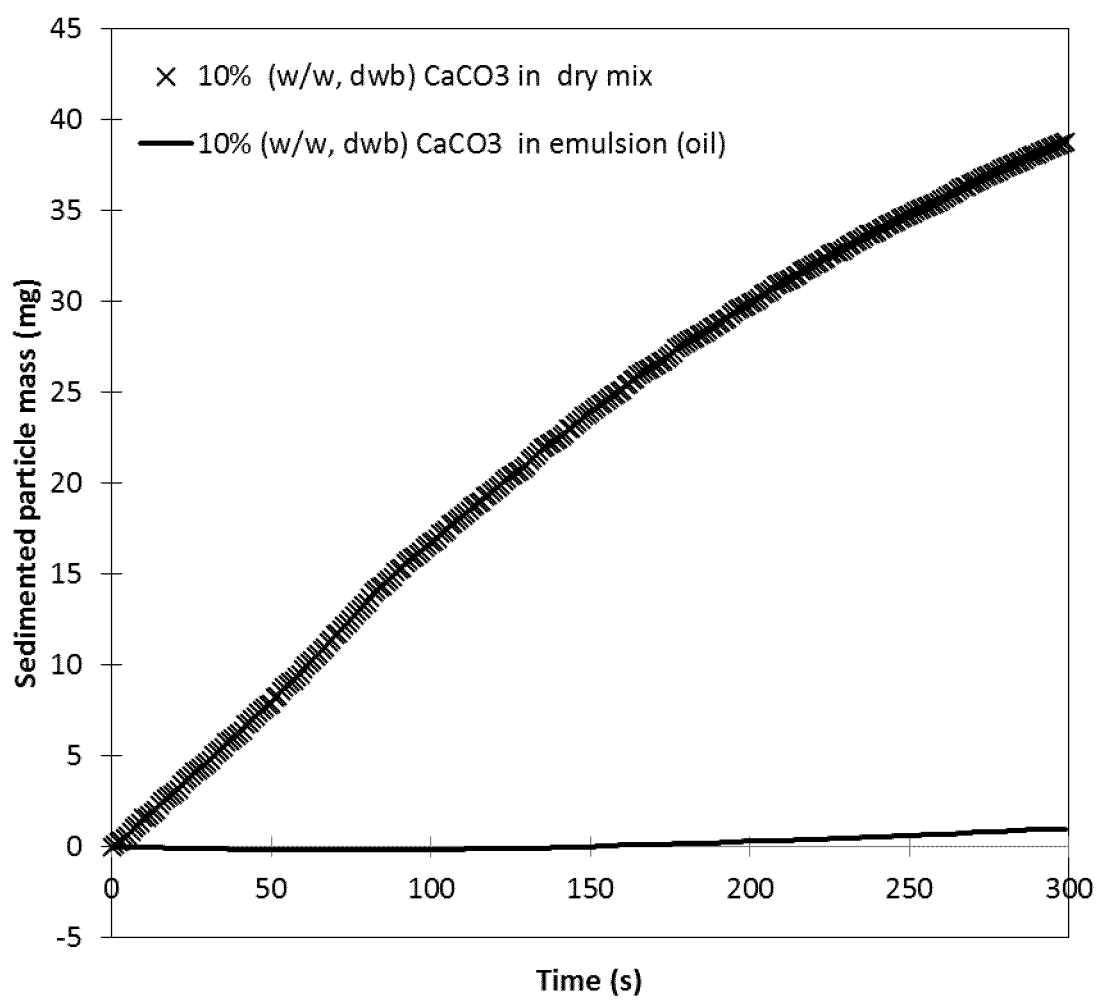
FIG. 2—Average sedimentation of coffee mixes with addition of 10% (w/w, dwb) $CaCO_3$ dispersed in the creamer emulsion compared to the dispersion in the dry creamer FIG. 3—Sensory pair comparison on the mouthfeel perception of coffee mixes with addition of 10% (w/w, dwb) $CaCO_3$ dispersed in oil or water phase compared to a reference without addition of particles FIG. 4—Sensory pair comparison on the mouthfeel perception of coffee mixes with addition of 10% (w/w, dwb) $CaCO_3$ dispersed in oil or water phase FIG. 5—Comparison of two methods of $CaCO_3$ incorporation into coffee mixes. Proportion of people perceiving coffee mixes with $CaCO_3$ as having more mouthfeel than the reference without addition of particles: A) 3 µm mean particle size (B) 10 µm mean particle size. Process A: High-shear-mixing, Process B: Bead milling.

Sensory pair comparison tests showed that the dry addition of 10% (w/w, dwb) of $CaCO_3$ with a mean particle size of about 3 µm into the powdered creamer lowers the proportion of people choosing the reconstituted coffee mix beverage as having more mouthfeel compared to samples where the same amount of $CaCO_3$ was added into the oil phase of the creamer preparation (FIG. 1). In addition, during the tasting some people mentioned that the sample with $CaCO_3$ directly added in the dry creamer was astringent and gritty. This behaviour could be explained in terms of the quality of the mix. It is known that differences in density and particle size promote segregation. It is possible that clusters of $CaCO_3$ of bigger particle size were formed which promoted a gritty perception and overshadow the mouthfeel enhancement. In addition, this could be reflected in the higher sedimentation observed for the coffee mixes with $CaCO_3$ dispersed directly in the dry creamer (FIG. 2). It was further determined that the optimal concentration of $CaCO_3$ with a mean particle size of 3 µm in the coffee beverage was from about 07.5 to 15% (w/w, dwb). The optimal concentration of $CaCO_3$ with a mean particle size of 10 µm in the coffee beverage was around 7.5% (w/w, dwb).

Based on these observations in all following investigations wet dispersion processes were used to introduce $CaCO_3$ particles into the creamer preparation.

Example 2—Effect of Dispersion Medium on Mouthfeel of Coffee Mixes Containing Micronized $CaCO_3$ Particles The effect of the dispersion medium (oil or water) was investigated for $CaCO_3$ particles incorporated into a creamer formulation. All results shown in this example refer to creamer preparations where $CaCO_3$ was added with a high shear mixer.

Figure 3:
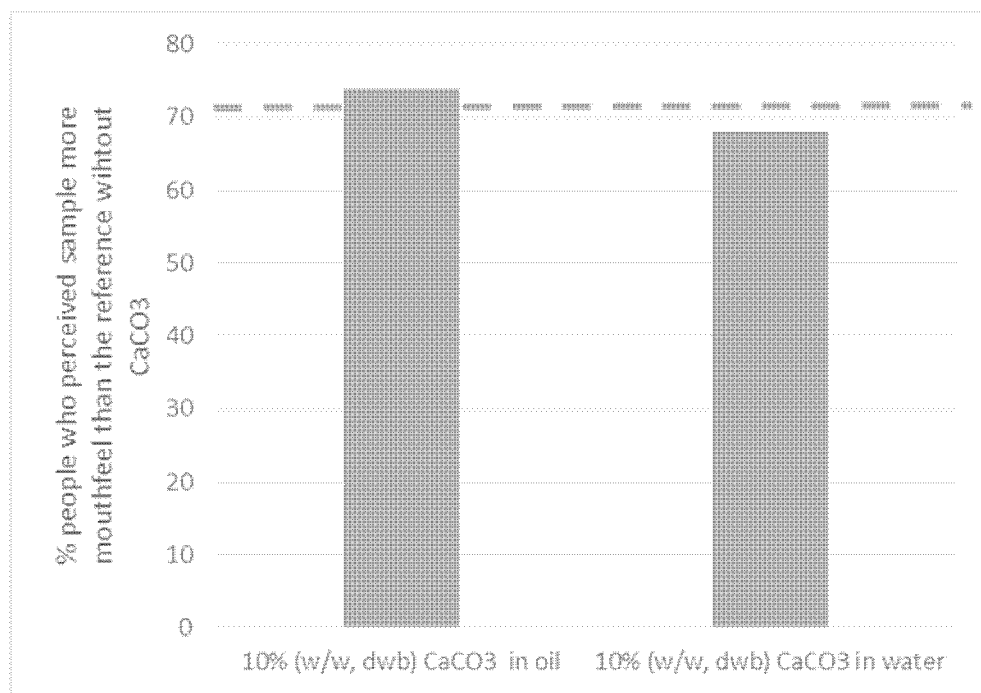
Figure 4:
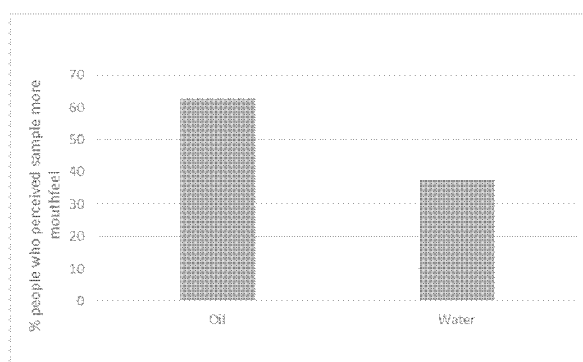

Sensory pair comparison tests showed that a similar proportion of people chose coffee mixes with 10% (w/w, dwb) added $CaCO_3$ as having more mouthfeel in comparison to the reference without added particles, independently of the dispersing phase (see FIG. 3). A direct comparison of samples containing equal amounts of $CaCO_3$ dispersed in the oil phase or the aqueous phase of the creamer preparation reveals that a higher proportion of people chose the sample with $CaCO_3$ dispersed in oil as more having mouthfeel (62.5%, see FIG. 4).

When comparing the physical stability of $CaCO_3$ dispersions with the help of a sedimentation balance, coffee mixes where $CaCO_3$ was dispersed by high shear mixing in the oil phase have a similar behaviour than those where $CaCO_3$ was dispersed in the aqueous phase.

Example 3—Effect of Dispersion Process on Mouthfeel and Stability of Coffee Mixes Containing Micronized $CaCO_3$ Particles As shown in Example 1, wet mixing of $CaCO_3$ into the creamer composition is favourable for dispersion stability (reduced sedimentation) and mouthfeel of the investigated coffee mixes. Therefore, in order to understand the influence of the wet mixing process on the decrease of the sedimentation of $CaCO_3$ particles in the coffee mixes, two processes of incorporation were studied: A) High-shear-mixing, B) Bead Milling (BM).

Figure 5A:
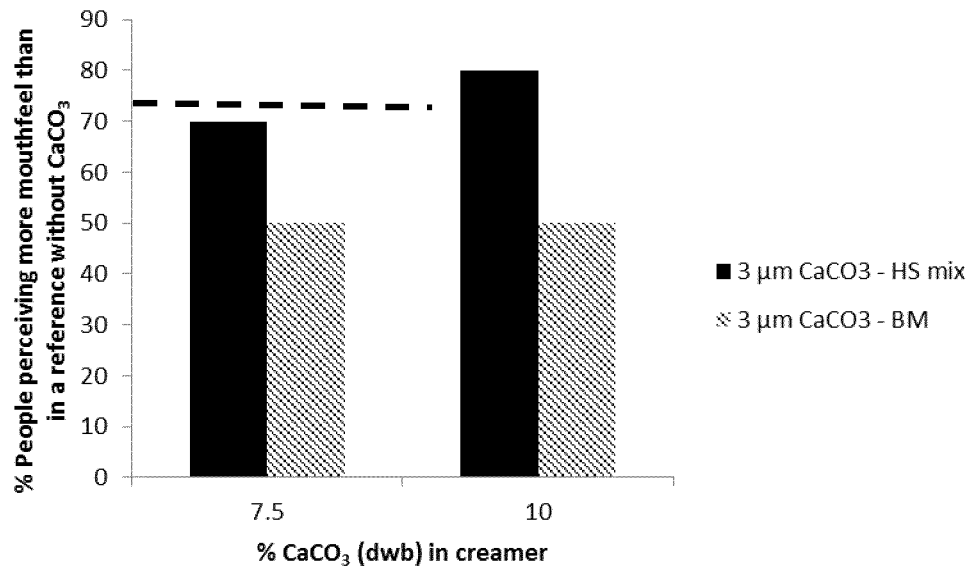
Figure 5:
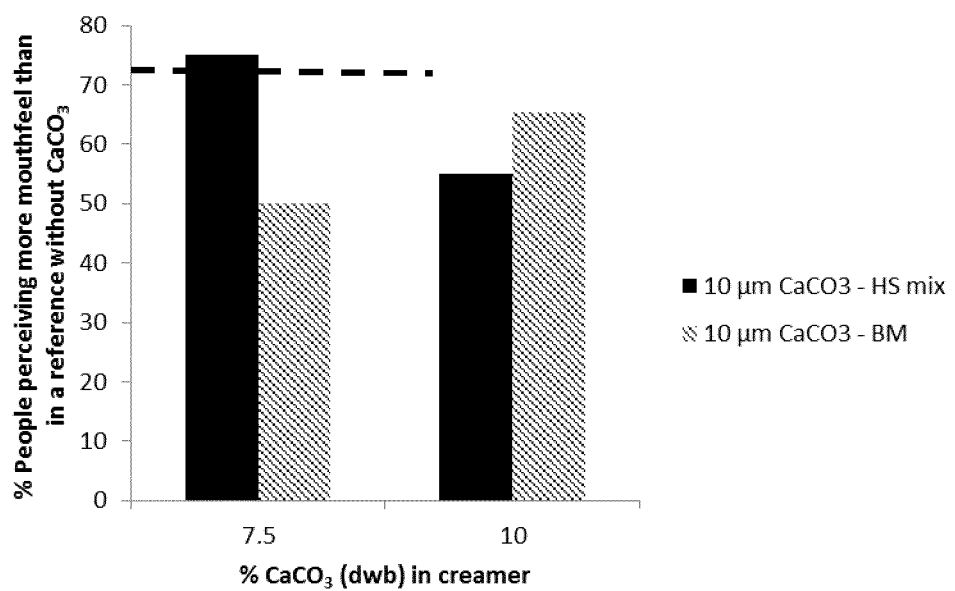

An informal tasting was performed in order to study if the different process of incorporation of $CaCO_3$ could influence the mouthfeel perception of beverages. Pair comparison sensory tests showed that the incorporation process affected the mouthfeel perception. FIG. 5A shows that less people chose the sample with 0.3 and 0.4% (w/w) $CaCO_3$ of 3 µm mean particle size if process B (Bead milling) was applied compared to process A (High-shear-mixing). Similarly, FIG. 5B shows the same behaviour for the 10 µm mean particle size at 0.3% (w/w) $CaCO_3$. However, at higher concentration the proportion of people choosing the sample with $CaCO_3$ of 10 µm mean particle size increased from 55 to 65%.

Methods and Materials

Materials

Hydrogenated palm kernel oil (Cargill), sodium caseinate (Lactoprot), buffer salts (Budenheim, K.C. Salt International), glucose syrup (San Soon Seng), emulsifiers (Danisco), and water (Vittel, Petite source) were used to prepare the creamer emulsion. Precipitated $CaCO_3$ (Dr. Paul Lohmann, Germany; Specialty Minerals, UK) were used. Table 1 shows the general characteristics of the $CaCO_3$. To prepare the coffee mixes, Nescafé Gold de Luxe (Nestlé, Switzerland) and mineral water (Vittel, petite source) were used.

TABLE 4

General Characteristics of $CaCO_3$

| | A | B | |
|---|---|---|---|
| Supplier Name | Dr. Paul Lohmann $CaCO_3$ light | Specialty Minerals Calopake extralight[1] | Sturcal L[2] |
| Origin | Precipitated | Precipitated | Precipitated |
| Bulk Density (g/cm$^3$) | 0.30 | 0.50 | 0.89 |
| Apparent Density (g/cm$^3$) | 2.82 | 2.86 | / |

TABLE 4-continued

General Characteristics of CaCO₃

|  | A | B |  |
| --- | --- | --- | --- |
| D[3, 2] (μm) | 2.69 | 1.76 | 1.49 |
| D[4, 3] (μm) | 3.64 | 3.96 | 9.76 |

[1]Small mean particle size
[2]Big mean particle size
[3]Density data given by supplier Methods For the water phase, all water soluble ingredients, except glucose syrup, were weighed and dissolved in a heat resistant vessel under vigorous magnetic agitation until no lumps were visible. They were kept at 1 hour under gentle agitation at 75°-80° C. in a water bath. After a 1 hour hydration, the glucose was added and mixed in a stirring plate until total dissolution.

For the oil phase, the oil was thawed in a microwave for 4 min at 750 W until totally melted. It was kept in a 75°-80° C. water bath and the emulsifiers were added and gently stirred until complete dissolution. The $CaCO_3$ was dispersed in the oil and stirred at 500 rpm/20 min in stirring plate. After that, the $CaCO_3$ was further dispersed for 1 min at 7000 rpm with a high shear mixer (L5M-A, Silverson, UK).

The emulsion was prepared by pouring the oil phase into the water phase to form a pre-emulsion which was kept under gentle agitation for 5 min at 75° C. in a water bath and further mixed with a high shear mixer for 1 min at 7000 rpm. The pre-emulsion was homogenized with a high pressure homogenizer (Rannie, APV, Switzerland) by 2 runs at 300 bars and 1 run at 50 bars.

To investigate the effect of the $CaCO_3$ incorporation medium, the $CaCO_3$ was alternatively incorporated in the water phase after the addition of the glucose syrup by dispersing it for 20 min at 500 rpm in a stirring plate and 1 min at 7000 rpm in a high shear mixer, or directly incorporated in the dry mix (each as an alternative to incorporation into the oil phase).

Detailed recipes for the creamer emulsions are shown in Table 8.

TABLE 8

| Ingredient | Reference | 5% (dwb) CaCO₃ | 7.5% (dwb) CaCO₃ | 10% (dwb) CaCO₃ | 15% (dwb) CaCO₃ |
| --- | --- | --- | --- | --- | --- |
| Sodium | 1.5 | 1.5 | 1.5 | 1.5 | 1.5 |
| Buffer salt | 1.6 | 1.6 | 1.6 | 1.6 | 1.5 |
| Sodium Chloride | 0.1 | 0.1 | 0.1 | 0.1 | 0.12 |
| Glucose syrup GG10 (96% ts wb) | 33.4 | 30.7 | 29.4 | 28.1 | 25.48 |
| Oil Palm Kernel-Hydrogenated | 15.8 | 15.8 | 15.8 | 15.8 | 15.80 |
| Emulsifier | 0.31 | 0.31 | 0.31 | 0.31 | 0.31 |
| CaCO3 | 0 | 2.6 | 3.9 | 5.3 | 7.89 |
| Water | 47.4 | 47.4 | 47.4 | 47.4 | 47.41 |
| TOTAL weight of recipe | 100.0 | 100.0 | 100.0 | 100.0 | 100.00 |

Note:
the concentration of $CaCO_3$ refers to dry weight basis (dwb) of the preparation. The sum of the dry mass in each recipe is 52.6 and the total dry mass % is therefore 52.6%

To study the effect of the addition of $CaCO_3$ particles on coffee mixes, coffee mixes were prepared and compared to a reference without solid particles. The coffee mixes were prepared by dispersing 12.1 g of fresh creamer (equivalent to 6.5 g of dry creamer at 98% TS) and 1.2 g of coffee were weighted per 150 ml of water. The water was heated in a kettle at 85° C.

Particle Size Distribution (PSD) Measurement

The particle size of the oil/water emulsion and beverages was measured by laser diffraction (Mastersizer 2000, Instrument, UK). The detailed parameters used are presented in Table 6. To measure the particles size of $CaCO_3$ a refractive index (RI) of 1.66 for material was used. Results are reported as the volume/surface mean diameter (D [3, 2]) and the mean diameter over volume (D [4, 3]).

TABLE 6

Set up parameters for the particle size distribution measurements in creamer emulsions and beverages

| Instrument Set up | | Sample set up | |
| --- | --- | --- | --- |
| Material RI/Absorption | 1.45/0.01 | Pump | 850 rpm |
| Dispersant RI/Absorption | 1.33/0.01 | Stirrer | 780 rpm |
| Measurement time | 12 s, 12000 snaps | Pre-measurement time | 1 min |
| Background time | 12 s, 12000 snaps | Cycle | 1 aliquot |
|  |  | Measurement Delay | 30 s |

Sedimentation Results

The sedimentation of $CaCO_3$ particles in coffee mixes was measured gravimetrically using an analytical balance (Mettle Toledo XP404S Excellence Plus with Density Determination Kit, precision 0.01 mg). A hanging plate, connected to the weighing cell through a vertical bar, was submerged in a cup with 150 ml of sample. Mettler Balance Link 4.02 software was used to record the mass of sediments settling onto the hanging plate as a function of time. All curves were measured in triplicates, at room temperature, for a duration of 5 minutes.

Sensory Evaluation

Pair Comparison tests were performed to compare the beverages with $CaCO_3$ to the reference without solid particles. Twenty to thirty untrained volunteers participated in the test. Two samples of 25 ml, with and without solid particles, were presented in randomized order to the subjects. They were asked to choose the sample perceived as more mouthfeel. Mouthfeel was defined to the panellist in terms of body (watery vs thick) and mouth coating.

Subjects were asked to stir the sample before tasting and cleaned their palates in between each sample with water. The test was performed in duplicate. It has been suggested that visual texture could influence creaminess in custards, condensed milk and cream. Therefore, to avoid any influence by the colour difference, black cups were used. The data was collected in paper questionnaires and statistically analysed using a binomial test.

Various modifications and variations of the described methods of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The invention claimed is:

1. A process for producing a creamer, the process comprising:
   a step selected from the group consisting of a and b below:
   (a) i) incorporating a mineral into an oil component by high shear mixing to provide a first composition; and
       ii) mixing the first composition with an aqueous component to provide a second composition; and
   (b) i) incorporating the mineral into an aqueous component to provide a first composition;
       ii) mixing the first composition with an oil component to provide a second composition; and
       iii) homogenizing the second composition from step ii) of (a) or (b) to provide an oil-in-water emulsion,
   wherein the mineral is selected from the group consisting of calcium carbonate, magnesium carbonate, calcium phosphate, silicon dioxide, dicalcium phosphate, magnesium phosphate, calcium stearate, magnesium stearate, magnesium silicate and titanium dioxide,
   wherein a mean particle size of the mineral is about 0.1 to 100 μm,
   wherein the high shear mixing is performed at a shear rate of about 5,000 to 500,000 $s^{-1}$ with a continuous in-line mixer for about 1 to 30 seconds or with a batch mixer in a tank for about 0.5 to 90 minutes,
   wherein the creamer does not comprise a hydrocolloid.

2. The process according to claim 1, wherein step i) of (b) is performed by high shear mixing or milling.

3. The process according to claim 1, wherein the mineral is selected from the group consisting of inorganic hard crystalline materials insoluble in water and oil and inorganic salts with poor water solubility.

4. The process according to claim 1, wherein the mineral is calcium carbonate.

5. The process according to claim 1, wherein the aqueous component comprises a milk protein and/or a plant protein.

6. The process according to claim 5, wherein the aqueous component is selected from the group consisting of skim milk solids, casein, caseinate and whey protein.

7. The process according to claim 1, further comprising the step of drying the oil-in-water emulsion to provide a dried creamer.

8. The process according to claim 1, further comprising the steps of:
   adding a bulking and/or sweetener agent(s) to the oil-in-water emulsion; and
   pasteurizing or commercially sterilizing the oil-in-water emulsion.

9. The process according to claim 1, wherein one or more emulsifiers are added.

10. The process according to claim 1, wherein the second composition provided in step ii) of (a) or (b) comprises at least 5% (w/w) of the oil component.

11. The process according to claim 1, wherein the second composition provided in step ii) of (a) or (b) comprises particles of the mineral in a concentration of at least 1.0% (w/w).

12. A creamer obtained by a process comprising:
    a step selected from the group consisting of a and b below:
    (a) i) incorporating a mineral into an oil component by high shear mixing to provide a first composition; and
        ii) mixing the first composition with an aqueous component to provide a second composition; and
    (b) i) incorporating the mineral into an aqueous component to provide a first composition;
        ii) mixing the first composition with an oil component to provide a second composition; and
        iii) homogenizing the second composition from step ii) of (a) or (b) to provide an oil-in-water emulsion,
    wherein the mineral is selected from the group consisting of calcium carbonate, magnesium carbonate, calcium phosphate, silicon dioxide, dicalcium phosphate, magnesium phosphate, calcium stearate, magnesium stearate, magnesium silicate and titanium dioxide,
    wherein a mean particle size of the mineral is about 0.1 to 100 μm,
    wherein the high shear mixing is performed at a shear rate of about 5,000 to 500,000 $s^{-1}$ with a continuous in-line mixer for about 1 to 30 seconds or with a batch mixer in a tank for about 0.5 to 90 minutes,
    wherein the creamer does not comprise a hydrocolloid.

13. A method for enhancing mouthfeel of a creamer, the method comprising using a mineral, wherein the mineral is incorporated into an oil component by high shear mixing or is incorporated into an aqueous component by high shear mixing or milling,
    wherein the mineral is selected from the group consisting of calcium carbonate, magnesium carbonate, calcium phosphate, silicon dioxide, dicalcium phosphate, magnesium phosphate, calcium stearate, magnesium stearate, magnesium silicate and titanium dioxide,
    wherein a mean particle size of the mineral is about 0.1 to 100 μm,
    wherein the high shear mixing is performed at a shear rate of about 5,000 to 500,000 $s^{-1}$ with a continuous in-line mixer for about 1 to 30 seconds or with a batch mixer in a tank for about 0.5 to 90 minutes,
    wherein the creamer does not comprise a hydrocolloid.

14. The process according to claim 6, wherein the caseinate is sodium caseinate.

* * * * *